(12) United States Patent
Roller et al.

(10) Patent No.: US 8,754,151 B2
(45) Date of Patent: Jun. 17, 2014

(54) MULTISTAGE POLYMER DISPERSIONS, PROCESSES FOR PREPARING THEM, AND USE THEREOF

(75) Inventors: Sebastian Roller, Mannheim (DE); Ekkehard Jahns, Weinheim (DE); Hans-Juergen Denu, Friedelsheim (DE)

(73) Assignee: BASF SE, Ludwigshafen (DE)

( * ) Notice: Subject to any disclaimer, the term of this patent is extended or adjusted under 35 U.S.C. 154(b) by 145 days.

(21) Appl. No.: 13/333,231

(22) Filed: Dec. 21, 2011

(65) Prior Publication Data

US 2012/0157577 A1 Jun. 21, 2012

Related U.S. Application Data

(60) Provisional application No. 61/425,287, filed on Dec. 21, 2010.

(51) Int. Cl.
| | | |
|---|---|---|
| C08K 3/20 | (2006.01) | |
| C08L 43/04 | (2006.01) | |
| C08K 3/00 | (2006.01) | |
| C08L 41/00 | (2006.01) | |
| C08F 2/38 | (2006.01) | |
| C08F 12/30 | (2006.01) | |
| C08F 22/02 | (2006.01) | |

(52) U.S. Cl.
USPC ........... 524/5; 524/543; 524/458; 524/817; 524/806; 524/460; 526/80; 526/87; 526/286; 526/307.6; 526/317.1; 526/318.2

(58) Field of Classification Search
USPC ............ 524/5, 547, 817, 806, 460, 543, 458; 526/80, 87, 287, 288, 307.6, 317.1, 526/318.2, 286
See application file for complete search history.

(56) References Cited

U.S. PATENT DOCUMENTS

| | | | |
|---|---|---|---|
| 3,673,218 A | 6/1972 | Cairns et al. | |
| 3,718,716 A | 2/1973 | Joh et al. | |
| 3,794,494 A | 2/1974 | Kai et al. | |
| 4,191,838 A | 3/1980 | Merger et al. | |
| 4,226,007 A | 10/1980 | Duenser | |
| 4,269,749 A | 5/1981 | Marriott et al. | |
| 4,999,218 A | 3/1991 | Rehmer et al. | |
| 5,047,295 A | 9/1991 | Dotzauer et al. | |
| 5,162,415 A | 11/1992 | Rehmer et al. | |
| 6,096,858 A | 8/2000 | Dobbelaar et al. | |
| 6,136,383 A | 10/2000 | Schwartz et al. | |
| 6,365,709 B1 | 4/2002 | Heibel et al. | |
| 6,433,132 B1 | 8/2002 | Wood et al. | |
| 6,444,760 B1 | 9/2002 | Rupaner et al. | |
| 6,462,138 B1 | 10/2002 | Rupaner et al. | |
| 6,645,563 B2 | 11/2003 | Zhao et al. | |
| 7,238,773 B2 | 7/2007 | Huebinger et al. | |
| 7,445,849 B2 * | 11/2008 | Apitz et al. | 428/451 |
| 8,030,391 B2 * | 10/2011 | Petri et al. | 524/457 |
| 8,334,350 B2 * | 12/2012 | Jahns et al. | 526/80 |
| 2005/0064249 A1 | 3/2005 | Apitz et al. | |
| 2009/0069495 A1 * | 3/2009 | Fichtner et al. | 524/555 |

FOREIGN PATENT DOCUMENTS

| | | |
|---|---|---|
| DE | 1 954 266 | 5/1970 |
| DE | 2 061 213 | 6/1971 |
| DE | 2 207 209 | 10/1972 |
| DE | 2 164 256 | 6/1973 |
| DE | 27 22 097 | 11/1978 |
| DE | 38 27 975 A1 | 3/1990 |
| DE | 39 01 073 A | 7/1990 |
| DE | 196 24 299 A1 | 1/1997 |
| DE | 196 21 027 A1 | 11/1997 |
| DE | 197 41 184 A1 | 3/1999 |
| DE | 197 41 187 A1 | 3/1999 |
| DE | 198 05 122 A1 | 4/1999 |
| DE | 198 28 183 A1 | 12/1999 |
| DE | 198 39 199 A1 | 3/2000 |
| DE | 198 40 586 A1 | 3/2000 |
| DE | 198 47 115 C1 | 5/2000 |
| DE | 103 43 726 A1 | 5/2005 |
| EP | 0 417 568 A2 | 3/1991 |
| EP | 0 469 295 A2 | 2/1992 |
| EP | 0 623 659 A2 | 11/1994 |
| EP | 0 771 328 | 5/1997 |
| EP | 0 821 660 | 2/1998 |
| EP | 0 894 780 A1 | 2/1999 |
| EP | 0 915 071 A2 | 5/1999 |
| EP | 1 466 929 A1 | 10/2004 |
| EP | 1 948 574 | 7/2008 |
| GB | 1411268 | 10/1975 |
| WO | WO 93/25588 A1 | 12/1993 |
| WO | WO 03/031526 A1 | 4/2003 |

* cited by examiner

Primary Examiner — Michael M Bernshteyn
(74) Attorney, Agent, or Firm — Oblon, Spivak, McClelland, Maier & Neustadt, L.L.P.

(57) ABSTRACT

The present invention relates to aqueous multistage polymer dispersions obtainable by free-radically initiated aqueous emulsion polymerization, having a soft phase and a hard phase, and a hard-to-soft stage ratio of 25% to 95% by weight to 75% to 5% by weight, the glass transition temperature (Tg) of the soft phase, as first stage, being −30 to 0° C. and that of the hard phase, as second stage, being 20 to 60° C., comprising at least one monomer of the general formula I (I)

$$\underset{O}{\overset{R1}{\underset{\|}{\diagup\mkern-12mu\diagdown}}}\,X\!\!-\!\!\underset{R2\ \ R3}{\overset{\phantom{|}}{\underset{\phantom{|}}{\diagdown}}}\!\!\text{–}\!\!\left[\phantom{X}\right]_{n}\!\!SO_3\!\!-\!\!Y^+$$

in which the variables have the following definitions:
n=0 to 2,
R1, R2, R3=independently of one another hydrogen or methyl group,
X=O or NH,
Y=H, alkali metal or $NH_4$,
to processes for preparing these aqueous polymer dispersions, and to the use thereof as binders in coatings, and also to coatings comprising the polymer dispersion of the invention.

16 Claims, No Drawings

MULTISTAGE POLYMER DISPERSIONS, PROCESSES FOR PREPARING THEM, AND USE THEREOF

CROSS-REFERENCE TO RELATED APPLICATIONS

This application is based upon and claims the benefit of priority to U.S. Provisional Application No. 61/425,287 filed on Dec. 21, 2010.

BACKGROUND OF THE INVENTION

The present invention relates to aqueous multistage polymer dispersions obtainable by free-radically initiated aqueous emulsion polymerization, having a soft phase and a hard phase, and a hard-to-soft stage ratio of 25% to 95% by weight to 75% to 5% by weight, the glass transition temperature (Tg) of the soft phase, as first stage, being −30 to 0° C. and that of the hard phase, as second stage, being 20 to 60° C., comprising at least one monomer of the general formula I

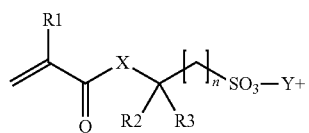

in which the variables have the following definitions:
n=0 to 2,
R1, R2, R3=independently of one another hydrogen or methyl group,
X=O or NH,
Y=H, alkali metal or $NH_4$.

The present invention further relates to processes for preparing these aqueous polymer dispersions, and also to the use thereof as binders in coatings, and also to coatings comprising the polymer dispersion of the invention.

Prior-art aqueous polymer dispersions are used as binders in coating compositions, especially for the coating of mineral surfaces and mineral moldings, such as, for example, fiber cement sheets and siding boards for wall cladding. Fiber cement sheets and siding boards are high-rate construction materials possessed of numerous advantages over other construction materials such as, for example, wood paneling, polyvinyl chloride sheets or metal siding boards, made from aluminum or steel sheet, for example. One major advantage is the durability of fiber cement sheets to weathering effects, and the mechanical stability, too, is oftentimes better than for other construction materials. Fiber cement sheets are manufactured from cement, water, optionally with fillers such as sand or silica, and of a fiber fraction comprising natural fibers, such as wood fibers or cellulosic fibers, for example, and also of synthetic fibers. The mixture is introduced into a mold, optionally dewatered on a sieve, and then cured. The raw mass may be cured as it is or else compacted by pressing in order to achieve a greater ultimate strength postcure. The fiber cement sheets may be manufactured as flat sheets or else as what are called corrugated sheets. The fiber cement sheets or siding boards may be given a surface texture, by embossing, which mimics the appearance of, for example, a wood surface. The sheets may be cut into a variety of shapes and sizes: large panels, small squares, rectangles or rombuses, or else as shingle replicas or replicas of other building materials. The fiber cement sheets are typically manufactured to a thickness of between 3 and 20 mm.

Fiber cement sheets and siding boards require curing. This is usually done in a humidified heat chamber with or without pressure. At temperatures above 30° C. to around 70° C., the curing of the cement takes place in an accelerated regime, within a few hours, to give a material having sufficient strength to resist being destroyed by crushing. Curing may also take place in an autoclave, under pressure, in which case the temperature may also be significantly higher, since water is unable to escape and it is not possible for the cement to "fire". The water needed for the hydration of the cement does not evaporate. Autoclave curing is operated, for example, at more than 100° C. to around 180° C.

A disadvantage of mineral surfaces and mineral moldings, such as fiber cement sheets, is that the effect of weathering (more particularly the action of water) leaches out the cationic constituents such as $Ca^{2+}$ over the course of time, lessening the strength of the components. A further deleterious property of mineral surfaces is the occurrence of efflorescence phenomena. These phenomena are presumably attributable to the polyvalent cations such as $Ca^{2+}$ which are present, in the mineral binders, in an alkaline environment. Through reaction with the carbon dioxide from the air, it is possible in this way for unattractive white lime flecks, difficult to dissolve in water, to form on the surface of the mineral moldings. The efflorescence may appear not only during the hardening of freshly prepared mineral moldings but also, under exposure to weathering, on mineral moldings that have already hardened.

In order to avoid the aforementioned deleterious properties, the mineral moldings are frequently provided with a coating. For this purpose nowadays, in general, aqueous coating systems are used which comprise as their film-forming constituent an aqueous polymer dispersion. Typical binders include styrene/acrylic ester copolymers, homopolymers and copolymers of vinyl acetate, straight acrylates, and the like (cf. e.g., DE 21 64 256). The coatings obtainable with these systems, however, are unable to provide satisfactory prevention of the passage of the cationic constituents (efflorescence). Moreover, coatings of this kind readily become soiled.

Since lime efflorescence occurs even during the setting of the cement, it may be sensible to apply the coating, as a protection against efflorescence, to the cement or concrete even before it has cured, when it is referred to as green concrete. After curing or setting, there may optionally be a second coating or further coatings with a paint or clear varnish, with subsequent drying in each case. In other instances, the efflorescence protection is coated only after the substrate has fully cured.

Protection to mineral surfaces and moldings from the above-described efflorescence has also been improved by coating materials based on styrene/acrylate dispersions or on straight-acrylate dispersions of EP-A 469 295 and of DE-A 195 14 266, respectively. For this purpose, EP-A 469 295 recommends the use of a specific anionic emulsifier, while DE-A 195 14 266 advises the use of polymers which comprise, in copolymerized form, specific monomers containing sulfonate groups.

DE 103 43 726 discloses coated concrete moldings featuring effective effluoroesence protection through the use of an aqueous polymer dispersion and of an anionic emulsifier having at least one phosphate and/or phosphonate group.

EP 915 071 discloses coatings based on copolymers of ethylenically unsaturated monomers including more than 0.2% to 5% by weight of itaconic acid.

Methods for preserving concrete roofing shingles with an aqueous polymer dispersion comprising a polymer P which comprises in free-radically copolymerized form, preferably, 2-acrylamido-2-methylpropanesulfonic acid are disclosed in EP 821 660.

EP 623 659 discloses multistage polymer dispersions and the use thereof in coating compositions. The dispersions disclosed therein, however, do not include a monomer of the general formula I.

EP 1 466 929 discloses multistage latex polymers and the use thereof in coating compositions or as a "protective coat" for fiber cement, among other materials.

WO 03/031526 discloses multistage latex polymers having a Tg gradient, and the use thereof.

EP 894 780 discloses coating materials for mineral moldings, such as fiber cement sheets, for example, comprising a polymer P2, which is a multistage polymer.

EP 1 948 574 discloses a coated fiber cement article whose coating is an impact-resistant multistage latex polymer, as an outer coating composition. The multistage latex polymer features a Tg gradient.

None of the multistage polymers disclosed in the prior art comprises a monomer of the general formula I.

Following their manufacture and curing, fiber cement sheets are often coated with an aqueous dispersion or paint based on an aqueous acrylate binder, in order to provide the necessary protection against efflorescence. The coating may be applied by dipping, spraying, rolling or brushing or by a curtain coater. In some instances, the back and the edges of the fiber cement sheet are coated as well. After coating and drying have been carried out, the fiber cement sheets are usually stacked on one another while still in a warm state. In such stacks, there may be instances of sticking of the coated sheets to one another, since the coating binders may be too soft and hence lacking sufficient blocking resistance.

The single-stage binders in prior-art coatings have the disadvantage that they are often too hard to achieve effective blocking resistance and therefore cannot be formulated without solvents or film-forming assistants. Moreover, the efflorescence protection provided by such coatings is frequently deserving of improvement. Under outdoor weathering conditions, these coatings may easily acquire cracks and become matt, in which case they do not have very good weathering resistance.

While the two-stage binders of the prior art do provide satisfactory blocking resistance, as a result of the hard-phase fraction therein, their weathering resistance, however, is not up to the requirements.

It was an object of the present invention, accordingly, to provide binders and also coating compositions, more particularly for the coating of mineral moldings, such as fiber cement coatings, which exhibit increased weather resistance and, moreover, feature excellent blocking resistance and outstanding efflorescence protection.

Surprisingly it has been found that multistage polymer dispersions obtainable by free-radically initiated aqueous emulsion polymerization, having a soft phase and a hard phase, and a hard-to-soft stage ratio of 25% to 95% by weight to 75% to 5% by weight (based on the polymer mass), the glass transition temperature of the soft phase, as first stage, being −30 to 0° C. and that of the hard phase, as second stage, being 20 to 60° C., comprising at least one monomer of the general formula I

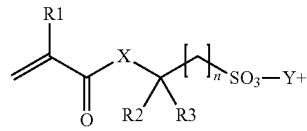

(I)

in which the variables have the following definitions:
n=0 to 2,
R1, R2, R3=independently of one another hydrogen or methyl group,
X=O or NH,
Y=H, alkali metal, $NH_4$, lead to coatings having increased weather resistance, in conjunction with excellent efflorescence protection and blocking behavior.

Substrates contemplated include not only industrially coated cementiceous substrates (e.g., fiber cement sheets) but also organic/inorganic substrates such as facings. The improved weather resistance is attributable to exceptionally good filming (low MFFT) in conjunction with relatively high film hardness, and is apparent, for example, in enhanced gloss retention after UV/water exposure (e.g., Suntest/Xenotest or outdoor weathering) for clear varnishes or coatings with low levels of pigmentation, or by good shade stability (color retention) in the case of more highly pigmented coatings. As well as the good weather resistance, the systems show excellent blocking resistance and outstanding efflorescence protection.

The aqueous multistage polymer dispersion of the invention is understood preferably to be an aqueous polymer dispersion whose soft phase, as first stage, has a Tg of −30 to 0° C., preferably of −20 to 0° C., and whose hard phase, as second stage, has a Tg of 20 to 60° C., preferably of 30 to 50° C., and a hard-to-soft stage ratio of 25-95:25-5.

The present invention further provides a process for preparing the aqueous polymer dispersion of the invention and also the use thereof as binders for mineral and nonmineral substances, and also the use thereof in coating compositions, more particularly for the coating of mineral moldings, such as fiber cement coatings.

The invention further provides coatings comprising the aqueous polymer dispersion of the invention, and also mineral moldings comprising the polymer dispersions of the invention as a coating.

Through the addition of the monomers I, considerably improved coatings are obtained for mineral moldings, more particularly for fiber cement sheets.

The polymer dispersions prepared in accordance with the invention are obtainable by free-radical emulsion polymerization of ethylenically unsaturated compounds (monomers). In the first stage a polymer is prepared from monomers which include at least one monomer I and also, optionally, a monomer having at least one acid group, in an amount of 0.1 part by weight, preferably of 0.5 to 2.5 parts by weight, based on the total amount of monomers of the first and second stages.

The acid monomers used in the first stage can be copolymerized with monomers without acid groups. The polymer of the first stage is preferably formed from at least 40% by weight of nonionic principal monomers, defined in more detail below, and also from a second kind of monomer, selected from ethylenically unsaturated acid monomers. The polymer of the first stage may, furthermore, optionally be formed from further, preferably nonionic, monomers. The polymer of the first stage is preferably composed to an extent of at least 40% by weight, more particularly from 60% to 99% by weight or from 80% to 98% by weight, based on all of the monomers of the first stage, of principal monomers which are selected from the group consisting of C1 to C20 alkyl (meth) acrylates, vinyl esters of carboxylic acids comprising up to 20 C atoms, vinylaromatics having up to 20 C atoms, ethylenically unsaturated nitriles, vinyl halides, vinyl ethers of alcohols comprising 1 to 10 C atoms, aliphatic hydrocarbons having 2 to 8 C atoms and one or two double bonds, and mixtures of these monomers. Principal monomers for the polymer of the first stage are, for example, (meth)acrylic acid alkyl esters having a $C_1$-$C_{10}$ alkyl radical, such as methyl methacrylate, methyl acrylate, n-butyl acrylate, ethyl acrylate, and 2-ethylhexyl acrylate. Also suitable in particular are mixtures of the (meth)acrylic acid alkyl esters. Vinyl esters of carboxylic acids having 1 to 20 C atoms are, for example, vinyl laurate, vinyl stearate, vinyl propionate, Versatic acid vinyl esters, and vinyl acetate. Suitable vinylaromatic compounds include vinyltoluene, alpha- and para-methylstyrene, alpha-butyl-styrene, 4-n-butylstyrene, 4-n-decylstyrene, and, preferably, styrene. Examples of nitriles are acrylonitrile and methacrylonitrile. The vinyl halides are ethylenically unsaturated compounds substituted by chlorine, fluorine or bromine, preferably vinyl chloride and vinylidene chloride. Examples of vinyl ethers include vinyl methyl ether and vinyl isobutyl ether. Vinyl ethers of alcohols comprising 1 to 4 C atoms are preferred. Hydrocarbons having 4 to 8 C atoms and two olefinic double bonds include butadiene, isoprene, and chloroprene. Preferred principal monomers for the polymer of the first stage are C1 to C10 alkyl acrylates, C1 to C10 alkyl methacrylates, vinyl esters of carboxylic acids comprising up to 20 C atoms, and mixtures of these monomers, more particularly $C_1$ to $C_8$ alkyl acrylates and $C_1$ to $C_8$ alkyl methacrylates and vinyl esters. Especially preferred are 2-ethylhexyl acrylate, butyl acrylate, methyl methacrylate, and styrene.

The polymer of the first stage further comprises optionally 0.1%, more particularly from 0.5% to 2.5%, by weight, based on all of the monomers of the first stage, of ethylenically unsaturated acid monomers. Examples of ethylenically unsaturated acid monomers are ethylenically unsaturated carboxylic acids, ethylenically unsaturated sulfonic acids, and vinylphosphonic acid. Ethylenically unsaturated carboxylic acids used are preferably alpha,beta-monoethylenically unsaturated monocarboxylic and dicarboxylic acids having 3 to 6 C atoms in the molecule. Examples of such are acrylic acid, methacrylic acid, itaconic acid, maleic acid, fumaric acid, crotonic acid, vinylacetic acid, vinyllactic acid, and 2-carboxyethyl acrylate. Examples of ethylenically unsaturated sulfonic acids include vinylsulfonic acid and styrenesulfonic acid. Preference is given to acrylic acid and methacrylic acid or a mixture thereof.

As monomers of the first stage, use may additionally be made of the amides and the hydroxyalkyl esters of α,β-unsaturated $C_3$-$C_6$ carboxylic acids, more preferably acrylamide, methacrylamide, 2-hydroxyethyl acrylate, 2-hydroxyethyl methacrylate, 2-hydroxypropyl (meth)acrylate or 1,4-butanediol monoacrylate. The monomers can be used individually or else in combinations of, for example, acids and amides.

As monomers of the first stage use is made additionally of monomers of the general formula I. These monomers comprehend, for example:
2-acrylamido-2-methylpropanesulfonic acid (AMPS)
methacrylic acid 3'-sulfopropyl ester
acrylic acid 3'-sulfopropyl ester
methacrylic acid 2'-sulfoethyl ester Among the alkali metal salts of the monomers of the general formula I, suitability is possessed more particularly by the sodium, ammonium, and potassium metal salts.

In one preferred embodiment the polymer of the first stage is a copolymer which
(i) is used in an amount of 5% to 50% by weight, based on 100 parts by weight of the total monomers to be polymerized in the first and second stages, and which
(ii) is composed to an extent of at least 80% and up to 99% by weight of principal monomers selected from the group consisting of C1 to C10 alkyl (meth)acrylates, amides and hydroxyalkyl esters of α,β-unsaturated $C_3$-$C_6$ carboxylic acids, more preferably acrylamide, methacrylamide, 2-hydroxyethyl acrylate, 2-hydroxyethyl methacrylate, 2-hydroxypropyl (meth)acrylate or 1,4-butanediol monoacrylate, and mixtures of these monomers, in particular n-butyl acrylate, methyl methacrylate, and acrylamide, and
(iii) comprises to an extent of at least 0.1% and up to 5% by weight, monomers I, which are preferably selected from the group of 2-acrylamido-2-methylpropanesulfonic acid (AMPS),
methacrylic acid 3'-sulfopropyl ester,
acrylic acid 3'-sulfopropyl ester,
methacrylic acid 2'-sulfoethyl ester.

In one preferred embodiment of the invention, the polymerization of the first stage takes place in the presence of seed latex. Seed latex is an aqueous dispersion of finely divided polymer particles having an average particle diameter of preferably 20 to 40 nm. Seed latex is used in an amount of preferably 0.05% to 5% by weight, more preferably of 0.1% to 3% by weight, based on the total monomer amount of the first and second stages. Suitability is possessed, for example, by a latex based on polystyrene or based on polymethyl methacrylate. A preferred seed latex is polystyrene seed.

The monomers used for the polymerization of the second stage are composed preferably to an extent of at least 60% by weight, more preferably at least 80% by weight, e.g., from 80% to 100% by weight, more preferably of at least 95% by weight, based on the total amount of monomers of the second stage, of one or more of the principal monomers described below. The principal monomers are selected from the group consisting of $C_1$-$C_{20}$ alkyl (meth)acrylates, vinyl esters of carboxylic acids comprising up to 20 C atoms, vinylaromatics having up to 20 C atoms, ethylenically unsaturated nitriles, vinyl halides, vinyl ethers of alcohols comprising 1 to 10 C atoms, aliphatic hydrocarbons having 2 to 8 C atoms and one or two double bonds, or mixtures of these monomers.

Examples include (meth)acrylic acid alkyl esters having a $C_1$-$C_{10}$ alkyl radical, such as methyl methacrylate, methyl acrylate, n-butyl acrylate, n-butyl methacrylate, ethyl acrylate, and 2-ethylhexyl acrylate. Also suitable in particular are mixtures of the (meth)acrylic acid alkyl esters. Vinyl esters of carboxylic acids having 1 to 20 C atoms are, for example, vinyl laurate, vinyl stearate, vinyl propionate, Versatic acid vinyl esters, and vinyl acetate. Suitable vinylaromatic compounds include vinyltoluene, alpha- and para-methylstyrene, alpha-butylstyrene, 4-n-butylstyrene, 4-n-decylstyrene, and, preferably, styrene. Examples of nitriles are acrylonitrile and methacrylonitrile. The vinyl halides are ethylenically unsaturated compounds substituted by chlorine, fluorine or bromine, preferably vinyl chloride and vinylidene chloride. Examples of vinyl ethers include vinyl methyl ether and vinyl isobutyl ether. Preference is given to vinyl ethers of alcohols comprising 1 to 4 C atoms. Hydrocarbons having 4 to 8 C atoms and two olefinic double bonds include butadiene, isoprene, and chloroprene.

Preferred principal monomers for the polymerization of the second stage are the $C_1$ to $C_{10}$ alkyl acrylates and $C_1$ to $C_{10}$ alkyl methacrylates, more particularly $C_1$ to $C_8$ alkyl acrylates and $C_1$ to $C_{10}$ alkyl methacrylates, and vinylaromatics, more particularly styrene, and mixtures thereof. Especially preferred are methyl acrylate, methyl methacrylate, ethyl acrylate, n-butyl acrylate, n-butyl methacrylate, n-hexyl acrylate, octyl acrylate, 2-ethylhexyl acrylate, 2-propylheptyl acrylate, styrene, vinyl acetate, and mixtures of these monomers.

Besides the principal monomers, the monomers for the polymerization of the second stage may comprise further monomers, examples being monomers with carboxylic acid, sulfonic acid or phosphonic acid groups. Carboxylic acid groups are preferred. Examples include acrylic acid, methacrylic acid, itaconic acid, maleic acid, and fumaric acid. Further monomers are, for example, also monomers comprising hydroxyl groups, especially $C_1$-$C_{10}$ hydroxyalkyl (meth)acrylates, and also (meth)acrylamide. As further monomers, mention may additionally be made of phenyloxyethylglycol mono(meth)acrylate, glycidyl acrylate, glycidyl methacrylate, and amino (meth)acrylates such as 2-aminoethyl (meth)acrylate. Further monomers that may be mentioned include crosslinking monomers.

The polymer of the second stage further comprises optionally 0.1%, more particularly from 0.5% to 2.5%, by weight, based on all of the monomers of the second stage, of ethylenically unsaturated acid monomers. Ethylenically unsaturated acid monomers are, for example, ethylenically unsaturated carboxylic acids, ethylenically unsaturated sulfonic acids, and vinylphosphonic acid. As ethylenically unsaturated carboxylic acids it is preferred to use alpha, beta-monoethylenically unsaturated monocarboxylic and dicarboxylic acids having 3 to 6 C atoms in the molecule. Examples of such are acrylic acid, methacrylic acid, itaconic acid, maleic acid, fumaric acid, crotonic acid, vinylacetic acid, vinyllactic acid, and 2-carboxyethyl acrylate. Examples of suitable ethylenically unsaturated sulfonic acids include vinylsulfonic acid and styrenesulfonic acid. Preference is given to acrylic acid and methacrylic acid and a mixture thereof.

As monomers of the second stage it is additionally possible to use the amides and the hydroxyalkyl esters of α,β-unsaturated $C_3$-$C_6$ carboxylic acids, more preferably acrylamide, methacrylamide, 2-hydroxyethyl acrylate, 2-hydroxyethyl methacrylate, 2-hydroxypropyl (meth)acrylate or 1,4-butanediol monoacrylate. The monomers may be used individually or else in combinations of, for example, acids and amides.

As monomers of the second stage use is likewise made, furthermore, of monomers of the general formula I.
These monomers comprehend, for example:
2-acrylamido-2-methylpropanesulfonic acid (AMPS)
methacrylic acid 3'-sulfopropyl ester
acrylic acid 3'-sulfopropyl ester
methacrylic acid 2'-sulfoethyl ester
Among the alkali metal salts of the monomers of the general formula I, suitability is possessed more particularly by the sodium, ammonium, and potassium metal salts.

The monomers for the polymerization of the second stage are selected in particular to an extent of at least 60% by weight, more preferably at least 80% by weight, e.g., from 60% to 99% by weight, and very preferably at least 95% by weight, from at least one $C_1$ to $C_{20}$ alkyl acrylate, at least one $C_1$ to $C_{20}$ alkyl methacrylate, a mixture thereof, or a mixture thereof with at least one further monomer selected from amides and the hydroxyalkyl esters of α,β-unsaturated $C_3$-$C_6$ carboxylic acids, more preferably acrylamide, methacrylamide, 2-hydroxyethyl acrylate, 2-hydroxyethyl methacrylate, 2-hydroxypropyl (meth)acrylate or 1,4-butanediol monoacrylate.

The monomers for the polymerization of the first stage are selected such that the glass transition temperature calculated for a polymer prepared from the monomers of the first stage is −30° C. to 0° C., and the glass transition temperature calculated for a polymer prepared from the monomers of the second stage is 20° C. to 60° C.

Through skillful variation in the nature and amount of the monomers it is possible for the skilled person, in accordance with the invention, to prepare aqueous polymer compositions whose polymers have a glass transition temperature within the desired range. Rangefinding is possible by means of the Fox equation. According to Fox (T. G. Fox, Bull. Am. Phys. Soc. 1956 [Ser. II] 1, page 123 and in accordance with Ullmann's Encyclopädie der technischen Chemie, volume 19, page 18, 4th edition, Verlag Chemie, Weinheim, 1980), the glass transition temperature of copolymers can be calculated in good approximation as follows:

$$1/T_g = x^1/T_g^1 + x^2/T_g^2 + \ldots x^n/T_g^n,$$

where $x^1, x^2, \ldots x^n$ are the mass fractions of the monomers 1, 2, ... n and $T_g^1, T_g^2, \ldots T_g^n$ are the glass transition temperatures of the polymers synthesized in each case only from one of the monomers 1, 2, ... n, in degrees Kelvin. The $T_g$ values for the homopolymers of the majority of monomers are known and are listed in, for example, Ullmann's Encyclopedia of Industrial Chemistry, volume A 21, 5th edition, page 169, VCH Weinheim, 1992; other sources of homopolymer glass transition temperatures include, for example, J. Brandrup, E. H. Immergut, Polymer Handbook, $1^{st}$ Ed., J. Wiley, New York 1966, $2^{nd}$ Ed. J. Wiley, New York 1975, and $3^{rd}$ Ed. J. Wiley, New York 1989. For ethyl acrylate a figure of −13° C. is used.

The actual glass transition temperature can be determined by means of differential scanning calorimetry (ASTM D 3418-08, midpoint temperature).

The weight ratio of the amount of monomers used in the first stage to the amount of monomers used in the second stage is preferably from 5:95 to 50:50.

In the preparation of the polymer dispersions of the invention it is possible to use at least one crosslinker in addition to the aforementioned monomers. Monomers which possess a crosslinking function are compounds having at least two polymerizable, ethylenically unsaturated, nonconjugated double bonds in the molecule. Crosslinking can also be accomplished, for example, by means of functional groups which are able to enter into a chemical crosslinking reaction with complementary functional groups. In that case the complementary groups may both be attached to the emulsion polymer or for the crosslinking it is possible to use a crosslinker which is capable of being able to enter into a chemical crosslinking reaction with functional groups of the emulsion polymer.

Suitable crosslinkers are, for example, acrylic esters, methacrylic esters, allyl ethers or vinyl ethers of at least dihydric alcohols. The OH groups of the parent alcohols may be wholly or partly etherified or esterified; the crosslinkers, however, comprise at least two ethylenically unsaturated groups.

Examples of the parent alcohols are dihydric alcohols such as 1,2-ethanediol, 1,2-propanediol, 1,3-propanediol, 1,2-butanediol, 1,3-butanediol, 2,3-butanediol, 1,4-butanediol, but-2-ene-1,4-diol, 1,2-pentanediol, 1,5-pentanediol, 1,2-hexanediol, 1,6-hexanediol, 1,10-decanediol, 1,2-dodecanediol, 1,12-dodecanediol, neopentyl glycol, 3-methylpentane-1,5-diol, 2,5-dimethyl-1,3-hexanediol, 2,2,4-trimethyl-1,3-pentanediol, 1,2-cyclohexanediol, 1,4-cyclohexanediol, 1,4-bis (hydroxymethyl)cyclohexane, hydroxypivalic acid neopentyl glycol monoester, 2,2-bis(4-hydroxyphenyl)propane, 2,2-bis[4-(2-hydroxypropyl)phenyl]propane, diethylene glycol, triethylene glycol, tetraethylene glycol, dipropylene glycol, tripropylene glycol, tetrapropylene glycol, 3-thiapentane-1,5-diol, and also polyethylene glycols, polypropylene glycols, and polytetrahydrofurans having molecular weights of in each case 200 to 10 000. Besides the homopolymers of ethylene oxide or propylene oxide it is also possible to use block copolymers of ethylene oxide or propylene oxide, or copolymers which incorporate ethylene oxide and propylene oxide groups. Examples of parent alcohols having more than two OH groups are trimethylolpropane, glycerol, pentaerythritol, 1,2,5-pentanetriol, 1,2,6-hexanetriol, cyanuric acid, sorbitan, sugars such as sucrose, glucose, and mannose. The polyhydric alcohols can of course also be used, following reaction with ethylene oxide or propylene oxide, in the form of the corresponding ethoxylates or propoxylates. The polyhydric alcohols can also first be converted to the corresponding glycidyl ethers by reaction with epichlorohydrin.

Additional suitable crosslinkers are the vinyl esters or the esters of monohydric, unsaturated alcohols with ethylenically unsaturated $C_3$-$C_6$ carboxylic acids, examples being acrylic acid, methacrylic acid, itaconic acid, maleic acid or fumaric acid. Examples of such alcohols are allyl alcohol, 1-buten-3-ol, 5-hexen-1-ol, 1-octen-3-ol, 9-decen-1-ol, dicyclopentenyl alcohol, 10-undecen-1-ol, cinnamyl alcohol, citronellol, crotyl alcohol or cis-9-octadecen-1-ol. An alternative option is to esterify the monohydric, unsaturated alcohols with polybasic carboxylic acids, examples being malonic acid, tartaric acid, trimellitic acid, phthalic acid, terephthalic acid, citric acid or succinic acid. A preferred crosslinker is allyl methacrylate.

Other suitable crosslinkers are esters of unsaturated carboxylic acids with the above-described polyhydric alcohols, examples being those of oleic acid, crotonic acid, cinnamic acid or 10-undecenoic acid.

Suitable crosslinkers, furthermore, are straight-chain or branched, linear or cyclic, aliphatic or aromatic hydrocarbons which possess at least two double bonds, which in the case of aliphatic hydrocarbons must not be conjugated, examples being divinylbenzene, divinyltoluene, 1,7-octadiene, 1,9-decadiene, 4-vinyl-1-cyclohexene, trivinylcyclohexane or polybutadienes having molecular weights of 200 to 20 000.

Further suitable crosslinkers are the acrylamides, methacrylamides, and N-allylamines of at least difunctional amines. Such amines are, for example, 1,2-diaminoethane, 1,3-diaminopropane, 1,4-diaminobutane, 1,6-diaminohexane, 1,12-dodecanediamine, piperazine, diethylenetriamine or isophoronediamine. Likewise suitable are the amides formed from allylamine and unsaturated carboxylic acids, such as acrylic acid, methacrylic acid, itaconic acid, maleic acid, or at least dibasic carboxylic acids, of the kind described above.

Furthermore, triallylamine and triallylmonoalkylammonium salts, e.g., triallylmethylammonium chloride or triallylmethylammonium methylsulfate, are suitable as crosslinkers.

Also suitable are N-vinyl compounds of urea derivatives, at least difunctional amides, cyanurates or urethanes, such as of urea, ethyleneurea, propyleneurea or tartaramide, for example, such as N,N'-divinylethyleneurea or N,N'-divinylpropyleneurea.

Further suitable crosslinkers are divinyldioxane, tetraallylsilane or tetravinylsilane. It will be appreciated that mixtures of the aforementioned compounds can also be used. Preference is given to using water-soluble crosslinkers.

Further included among the crosslinking monomers are those which as well as an ethylenically unsaturated double bond contain a reactive functional group, such as an aldehyde group, a keto group or an oxirane group, able to react with an added crosslinker. The functional groups are preferably keto groups or aldehyde groups. The keto or aldehyde groups are preferably attached to the polymer through copolymerization of copolymerizable, ethylenically unsaturated compounds with keto or aldehyde groups. Suitable such compounds are acrolein, methacrolein, vinyl alkyl ketones having 1 to 20, preferably 1 to 10, carbon atoms in the alkyl radical, formylstyrene, (meth)acrylic acid alkyl esters having one or two keto or aldehyde groups or one aldehyde group and one keto group in the alkyl radical, the alkyl radical preferably comprising a total of 3 to 10 carbon atoms, examples being (meth)acryloxyalkylpropanals, as described in DE-A-2722097. Also suitable, furthermore, are N-oxoalkyl(meth)acrylamides of the kind known, for example, from U.S. Pat. No. 4,226,007, DE-A-2061213 or DE-A-2207209. Particularly preferred are acetoacetyl (meth)acrylate, acetoacetoxyethyl (meth)acrylate and, more particularly, diacetoneacrylamide. The crosslinkers are preferably a compound with at least 2 functional groups, more particularly 2 to 5 functional groups, which are able to enter into a crosslinking reaction with the functional groups of the polymer, especially the keto or aldehyde groups. Functional groups for the crosslinking of the keto or aldehyde groups include, for example, hydrazide, hydroxylamine or oxime ether or amino groups. Suitable compounds of hydrazide groups are, for example, polycarboxylic hydrazides having a molar weight of up to 500 g/mol. Particularly preferred hydrazide compounds are dicarboxylic dihydrazides having preferably 2 to 10 C atoms. Examples of such include oxalic dihydrazide, malonic dihydrazide, succinic dihydrazide, glutaric dihydrazide, adipic dihydrazide, sebacic dihydrazide, maleic dihydrazide, fumaric dihydrazide, itaconic dihydrazide and/or isophthalic dihydrazide. Of particular interest are the following: adipic dihydrazide, sebacic dihydrazide, and isophthalic dihydrazide. Suitable compounds with hydroxylamine or oxime ether groups are specified for example in WO 93/25588.

Other suitable crosslinkers, which may be used in the polymerization of the first stage, and in the second stage, and also thereafter, include, for example, acetoacetoxyalkyl (meth) acrylates, N-vinylpyrrolidone, N-(2-methacryloyloxyethyl) ethyleneurea, N-(2-acryloyloxyethyl)-ethyleneurea, 2-acetoacetoxyethyl acrylate, 2-acetoacetoxyethyl methacrylate, and diacetoneacrylamide.

The crosslinking component is used preferably in an amount of 0.0005% to 5%, more preferably 0.001% to 2.5%, more particularly 0.01% to 1.5%, by weight, based on the total weight of the monomers used for the polymerization (including the crosslinker). The crosslinkers may be used only in the first stage, only in the second stage, or else in both stages.

The free-radical polymerization of the monomer mixture M) may take place in the presence of at least one regulator. Regulators are used preferably in an amount of 0.0005% to 5%, more preferably of 0.001% to 2.5%, and more particularly of 0.01% to 1.5% by weight, based on the total weight of the monomers used for the polymerization.

Chain transfer regulators (polymerization regulators) is a general term for compounds having high transfer constants. Regulators accelerate chain transfer reactions to bring about reduction in the degree of polymerization of the resultant polymers without affecting the overall reaction rate. Regulators may be subdivided into monofunctional, difunctional or polyfunctional regulators, depending on the number of functional groups in the molecule that are able to lead to one or more chain transfer reactions. Suitable regulators are described comprehensively, for example, by K. C. Berger and G. Brandrup in J. Brandrup, E. H. Immergut, Polymer Handbook, 3$^{rd}$ ed., John Wiley & Sons, New York, 1989, pp. II/81-II/141.

Examples of suitable regulators include aldehydes such as formaldehyde, acetaldehyde, propionaldehyde, n-butyraldehyde, and isobutyraldehyde.

Other regulators which can also be used are as follows: formic acid, its salts or esters, such as ammonium formate, 2,5-diphenyl-1-hexene, hydroxylammonium sulfate, and hydroxylammonium phosphate.

Further suitable regulators are halogen compounds, examples being alkyl halides such as tetrachloromethane, chloroform, bromotrichloromethane, bromoform, allyl bromide, and benzyl compounds such as benzyl chloride or benzyl bromide.

Further suitable regulators are allyl compounds, such as allyl alcohol, functionalized allyl ethers, such as allyl ethoxylates, alkyl allyl ethers or glycerol monoallyl ether.

As regulators it is preferred to use compounds comprising sulfur in bound form.

Examples of compounds of this kind are inorganic hydrogen sulfites, disulfites, and dithionites or organic sulfides, disulfides, polysulfides, sulfoxides, and sulfones. They include di-n-butyl sulfide, di-n-octyl sulfide, diphenyl sulfide, thiodiglycol, ethylthioethanol, diisopropyl disulfide, di-n-butyl disulfide, di-n-hexyl disulfide, diacetyl disulfide, diethanol sulfide, di-tert-butyl trisulfide, dimethyl sulfoxide, dialkyl sulfide, dialkyl disulfide and/or diaryl sulfide.

Suitable polymerization regulators further include thiols (compounds which acquire sulfur in the form of SH groups, also referred to as mercaptans). Preferred regulators are mono-, di-, and polyfunctional mercaptans, mercapto alcohols and/or mercapto carboxylic acids. Examples of these compounds are allyl thioglycolates, ethyl thioglycolate, cysteine, 2-mercaptoethanol, 1,3-mercaptopropanol, 3-mercaptopropane-1,2-diol, 1,4-mercaptobutanol, mercaptoacetic acid, 3-mercaptopropionic acid, mercaptosuccinic acid, thioglycerol, thioacetic acid, thiourea, and alkyl mercaptans such as n-butyl mercaptan, and tert-n-hexyl mercaptan or n-dodecyl mercaptan.

Examples of difunctional regulators, comprising two sulfur atoms in bound form, are difunctional thiols such as, for example, dimercaptopropanesulfonic acid (sodium salt), dimercaptosuccinic acid, dimercapto-1-propanol, dimercaptoethane, dimercaptopropane, dimercaptobutane, dimercaptopentane, dimercaptohexane, ethylene glycol bisthioglycolates and butanediol bisthioglycolate. Examples of polyfunctional regulators are compounds which comprise more than two sulfur atoms in bound form. Examples thereof are trifunctional and tetrafunctional mercaptans.

All of the stated regulators may be used individually or in combination with one another. One specific embodiment relates to polymer dispersions which are prepared by free-radical emulsion polymerization without addition of a regulator.

To prepare the polymers it is possible to polymerize the monomers with the aid of initiators that form free radicals.

As initiators for the free-radical polymerization it is possible to employ the peroxo and/or azo compounds customary for the purpose, examples being alkali metal or ammonium peroxydisulfates, diacetyl peroxide, dibenzoyl peroxide, succinyl peroxide, di-tert-butyl peroxide, tert-butyl perbenzoate, tert-butyl perpivalate, tert-butyl peroxy-2-ethylhexanoate, tert-butyl permaleate, cumene hydroperoxide, diisopropyl peroxydicarbamate, bis(o-toluoyl) peroxide, didecanoyl peroxide, dioctanoyl peroxide, dilauroyl peroxide, tert-butyl perisobutyrate, tert-butyl peracetate, di-tert-amyl peroxide, tert-butyl hydroperoxide, azobisisobutyronitrile, 2,2'-azobis (2-amidinopropane)dihydrochloride or 2-2'-azobis(2-methylbutyronitrile). Mixtures of these initiators are suitable as well.

Among the initiators that can be used are reduction/oxidation (i.e., redox) initiator systems. The redox initiator systems are composed of at least one, usually inorganic, reducing agent and one organic or inorganic oxidizing agent. The oxidizing component comprises, for example, the initiators already specified above for the emulsion polymerization. In the case of the reducing component the compound in question comprises, for example, alkali metal salts of sulfurous acid, such as sodium sulfite, sodium hydrogen sulfite, alkali metal salts of disulfurous acid such as sodium disulfite, bisulfite addition compounds of aliphatic aldehydes and ketones, such as acetone bisulfite, or reducing agents such as hydroxymethanesulfinic acid and its salts, or ascorbic acid. The redox initiator systems can be used along with soluble metal compounds whose metallic component is able to occur in a plurality of valence states. Typical redox initiator systems are, for example, ascorbic acid/iron(II) sulfate/sodium peroxodisulfate, tert-butyl hydroperoxide/sodium disulfite, tert-butyl hydroperoxide/Na hydroxymethanesulfinic acid. The individual components, the reducing component for example, may also be mixtures—for example, a mixture of the sodium salt of hydroxymethanesulfinic acid with sodium disulfite.

The amount of initiators is generally 0.1% to 10% by weight, preferably 0.1% to 5% by weight, based on all of the monomers to be polymerized. It is also possible to use two or more different initiators in the emulsion polymerization.

The preparation of the polymer dispersion takes place typically in the presence of at least one surface-active compound. A comprehensive description of suitable protective colloids is found in Houben-Weyl, Methoden der organischen Chemie, volume XIV/1, Makromolekulare Stoffe, Georg Thieme Verlag, Stuttgart, 1961, pp. 411 to 420. Suitable emulsifiers are also found in Houben-Weyl, Methoden der organischen Chemie, volume 14/1, Makromolekulare Stoffe, Georg Thieme Verlag, Stuttgart, 1961, pages 192 to 208.

Suitable emulsifiers are anionic, cationic, and nonionic emulsifiers. As surface-active substances it is preferred to use emulsifiers, whose relative molecular weights are typically below those of protective colloids.

Useful nonionic emulsifiers are araliphatic or aliphatic nonionic emulsifiers, examples being ethoxylated mono-, di-, and trialkylphenols (EO degree: 3 to 50, alkyl radical: $C_4$-$C_{10}$), ethoxylates of long-chain alcohols (EO degree: 3 to 100, alkyl radical: $C_8$-$C_{36}$) and also polyethylene oxide/polypropylene oxide homopolymers and copolymers. These may comprise the alkylene oxide units copolymerized in random distribution or in the form of blocks. Highly suitable, for example, are EO/PO block copolymers. Preference is given to using ethoxylates of long-chain alkanols (alkyl radical $C_1$-$C_{30}$, average degree of ethoxylation 5 to 100) and, of these, particular preference to those having a linear $C_{12}$-$C_{20}$ alkyl radical and an average degree of ethoxylation of 10 to 50, and also ethoxylated monoalkylphenols.

Examples of suitable anionic emulsifiers are alkali metal salts and ammonium salts of alkyl sulfates (alkyl radical: $C_8$-$C_{22}$), of sulfuric monoesters with ethoxylated alkanols (EO degree: 2 to 50, alkyl radical: $C_{12}$-$C_{18}$) and with ethoxylated alkylphenols (EO degree: 3 to 50, alkyl radical: $C_4$-$C_9$), of alkylsulfonic acids (alkyl radical: $C_{12}$-$C_{18}$), and of alkylarylsulfonic acids (alkyl radical: $C_9$-$C_{18}$). Further suitable emulsifiers are found in Houben-Weyl, Methoden der organischen Chemie, volume XIV/1, Makromolekulare Stoffe, Georg-Thieme-Verlag, Stuttgart, 1961, pp. 192-208). Likewise suitable as anionic emulsifiers are bis(phenylsulfonic acid) ethers and/or their alkali metal or ammonium salts which carry a $C_4$-$C_{24}$ alkyl group on one or both aromatic rings. These compounds are general knowledge, from U.S. Pat. No. 4,269,749, for example, and are available commercially, in the form for example of Dowfax® 2A1 (Dow Chemical Company).

Suitable cationic emulsifiers are preferably quaternary ammonium halides, e.g., trimethylcetylammonium chloride, methyltrioctylammonium chloride, benzyltriethylammonium chloride or quaternary compounds of N—$C_6$-$C_{20}$ alkylpyridines, -morpholines or -imidazoles, e.g. N-laurylpyridinium chloride.

The amount of emulsifier is generally about 0.01 to 10% by weight, preferably 0.1% to 5% by weight, based on the amount of monomers to be polymerized.

The neutralization of acid groups of the first polymer takes place preferably by at least partial feed of a neutralizing agent during the polymerization of the second stage, the neutralizing agent feed taking place preferably in parallel with the monomer feed. In this case the neutralizing agent may be added in a joint feed with the monomers to be polymerized, or in a separate feed. After all of the monomers have been fed in, the amount of neutralizing agent present in the polymerization vessel is preferably that required to neutralize at least 10%, preferably 30% to 100% or 30% to 90%, acid equivalents.

The emulsion polymerization takes place in general at 30 to 130° C., preferably at 50 to 95° C. The polymerization medium may be composed either only of water, or else of mixtures of water and water-miscible liquids such as methanol. It is preferred to use just water. The emulsion polymerization of the first stage may be carried out as a batch operation or else in the form of a feed process, including staged or gradient procedures. In the polymerization, a polymer seed is included in the initial charge, preferably, for more effective setting of the particle size.

The manner in which the initiator is added to the polymerization vessel in the course of the free-radical aqueous emulsion polymerization is known to a person of ordinary skill in the art. The initiator may either be included in its entirety in the initial charge to the polymerization vessel, or else used at the rate at which it is consumed in the course of the free-radical aqueous emulsion polymerization, continuously or in stages. In each specific case this is dependent on the chemical nature of the initiator system and also on the polymerization temperature. It is preferred to include part in the initial charge and to supply the remainder to the polymerization zone at the rate of its consumption. For removing the residual monomers, it is usual, after the end of the actual emulsion polymerization as well, i.e., after a monomer conversion of at least 95%, to add initiator. The individual components in the case of the feed process may be added to the reactor from above, in the side, or from below, through the reactor bottom.

In the case of emulsion polymerization, aqueous polymer dispersions generally with solids contents of 15% to 75% by weight are obtained, preferably of 40% to 75% by weight, more preferably of greater than or equal to 50% by weight. For a high space/time yield of the reactor, dispersions with a very high solids content are preferred. In order to be able to achieve solids contents >60% by weight, a bimodal or polymodal particle size ought to be set, since otherwise the viscosity becomes too high and the dispersion can no longer be managed. Producing a new generation of particles can be accomplished, for example, by addition of seed (EP 81083), by addition of excess amounts of emulsifier, or by addition of miniemulsions. A further advantage associated with the low viscosity and high solids content is the improved coating behavior at high solids contents. Producing one or more new particle generations can be done at any desired point in time. This point in time is guided by the target particle size distribution for a low viscosity.

Frequently it is advantageous if the aqueous polymer dispersion obtained after the end of the polymerization stages is subjected to an aftertreatment for the purpose of reducing the residual monomer content. In this case the aftertreatment takes place either chemically, as for example by completing the polymerization reaction by using a more effective radical initiator system (known as postpolymerization), and/or physically, as for example by stripping the aqueous polymer dispersion with steam or inert gas. Corresponding chemical and/or physical methods are familiar to the skilled person [see, for example, EP-A 771 328, DE-A 196 24 299, DE-A 196 21 027, DE-A 197 41 184, DE-A 197 41 187, DE-A 198 05 122, DE-A 198 28 183, DE-A 198 39 199, DE-A 198 40 586 and 198 47 115]. A combination of chemical and physical aftertreatments possesses the advantage that not only the unreacted ethylenically unsaturated monomers but also other disruptive volatile organic compounds (VOCs) are removed from the aqueous polymer dispersion.

In one embodiment of the invention, both stages use a silane monomer, such as, for example, vinyltrialkoxysilanes, e.g. vinyltrimethoxysilane, alkylvinyldialkoxysilanes, e.g., methylvinyldialkoxysilane, or (meth)acryloxyalkyltrialkoxysilanes, e.g., (meth)acryloyloxypropyltrimethoxysilane and (meth)acryloyloxypropyltriethoxysilane. These silane monomers can be used in amounts of up to 2% by weight, preferably 0.05% to 1% by weight, based on the total weight of the monomers.

The aqueous polymer dispersions obtainable by the process of the invention have polymer particles with a weight-average particle diameter $D_w$ in the range ≥50 and ≤500 nm, preferably ≥70 and ≤300 nm, and with particular preference ≥80 nm to ≤200 nm. The determination of the weight-average particle diameters is known to the skilled person and is accomplished, for example, via the method of the analytical ultracentrifuge. By weight-average particle diameter in this specification is meant the weight-average $D_{w50}$ value as determined by the method of the analytical ultracentrifuge (in this regard see S. E. Harding et al., Analytical Ultracentrifugation in Biochemistry and Polymer Science, Royal Society of Chemistry, Cambridge, Great Britain 1992, Chapter 10, Analysis of Polymer Dispersions with an Eight-Cell AUC Multiplexer: High Resolution Particle Size Distribution and Density Gradient Techniques, W. Mächtle, pages 147 to 175).

In addition, the corresponding polymer powders are obtainable from the aqueous polymer dispersion of the invention in a simple way (as for example by freeze drying or spray drying). These inventively accessible polymer powders may likewise be used as a component in the production of coating compositions for organic substrates and also for modifying mineral binders.

The aqueous polymer dispersion typically has a solids content of 20% to 70% by weight, preferably 40% to 65% by weight.

The aqueous dispersion of the polymer can be used, for the purposes of the process of the invention, not only as it is but also with additions, for the purpose of preserving a mineral molding (e.g., fiber cement sheets). Such additions may include the following: an aromatic ketone such as benzophenone, according to DE-A 38 27 975, as a photoinitiator for the purpose of crosslinking with exposure to electromagnetic radiation, or a water-soluble dihydrazide, according to DE-A 39 01 073, when the polymer comprises carbonyl-containing monomers in copolymerized form.

Furthermore, the aqueous preparations employed in accordance with the invention may also comprise crosslinking additions. Additions of this kind may be as follows: aromatic ketones, e.g., alkyl phenyl ketones, optionally with one or more substituents on the phenyl ring, or benzophenone and substituted benzophenones as photoinitiators. Photoinitiators suitable for this purpose are known from DE-A 38 27 975 and from EP-A 417 568, for example. Suitable compounds with a crosslinking action are also water-soluble compounds having at least two amino groups, examples being dihydrazides of aliphatic dicarboxylic acids, according to DE-A 39 01 073, when the copolymer comprises carbonyl-containing monomers in copolymerized form.

In one preferred embodiment of the present invention the aqueous preparations are used in the form of a transparent varnish. In that case they comprise, based on their overall weight, 10% to 60% by weight, preferably 40% to 55% by weight, of at least one copolymer P and 0.1% to 30% by weight, preferably 0.5% to 10% by weight, of customary auxiliaries, particularly defoamers and/or film-forming assistants.

In another embodiment of the present invention, the aqueous preparations are used in the form of pigmented and/or filled preparations. In this case the total polymer content of the aqueous preparation is in the range from 10% to 60% by weight, preferably in the range from 20% to 40% by weight, and the auxiliaries content is in the range from 0.1% to 30% by weight and preferably in the range from 0.5 to 10% by weight, and the fillers and/or pigments content is in the range from 10% to 60% by weight and more particularly 15% to 40% by weight. The amount of pigments and/or fillers is generally between 50 and 450 parts by weight, based on 100 parts by weight of copolymer P in the aqueous preparation. Furthermore, pigmented preparations will preferably also include a dispersant and/or wetting agent in addition to the film-forming assistants and the defoamers.

In particularly large numbers of instances, the aqueous dispersion of the polymer is employed in pigmented form for preservation. Typical white pigments are, for example, titanium dioxide, preferably in the rutile form, barium sulfate, zinc oxide or lithopones (zinc sulfide+barium sulfate). For decorative purposes the preparations may also comprise colored pigments, examples being iron oxides, carbon black, graphite, zinc yellow, zinc green, ultramarine, manganese black, antimony black, manganese violet, Paris blue or Schweinfurt green.

As pigments (frequently also referred to as fillers), suitability is possessed further by, for example, barium sulfate, talc, mica, calcium carbonate, dolomite, finely ground quartz, and mixtures thereof.

The pigmented paints and transparent varnishes of the invention may comprise further customary auxiliaries, such as wetting agents, in-can preservatives, film preservatives, thickeners, defoamers, fungicides, algicides, flow promoters, and antifreeze agents, for example, in the conventional amounts.

Generally speaking, the amount of dispersant used is 0.5% to 6%, preferably 1% to 3% by weight, based on the amount of monomers to be polymerized free-radically.

The application rate of the aqueous polymer preparation to be applied for preservation is typically 50 to 400 g/m2 (calculated on a wet basis). Application may take place in a conventional way, by spraying, troweling, knifing, rolling or pouring. It is important that the process of the invention can be applied not only with mineral moldings that have already hardened but also with freshly prepared ("green") mineral moldings, such as fiber cement sheets. Consequently, further application with coating material is performed after curing, with subsequent drying.

EXAMPLES

1) Comparative Dispersion $T_g$(theo.)=44° C.

The components below were introduced into a polymerization vessel equipped with metering means and temperature regulation:

Initial Charge:

| | |
|---|---|
| 402.1 g | water |
| 13.26 g | 20% aqueous solution of $C_{16\text{-}18}$ fatty alcohol polyethoxylate |
| 8.71 g | 45% aqueous solution of dodecyl diphenyl ether disulfonic acid sodium salt |

In a feed vessel, an emulsion was prepared from the following components:

| | |
|---|---|
| 560.2 g | water |
| 19.89 g | 20% aqueous solution of $C_{16\text{-}18}$ fatty alcohol polyethoxylate |
| 34.85 g | 45% aqueous solution of dodecyl diphenyl ether disulfonic acid sodium salt |
| 5.23 g | 50% aqueous solution of 2-acrylamido-2-methylpropanesulfonic acid |
| 13.07 g | 50% aqueous solution of acrylamide |
| 392.0 g | n-butyl acrylate |
| 908.2 g | methyl methacrylate |

In a third feed vessel the following feed was prepared:
Feed 3

| | |
|---|---|
| 56.00 g | 7% aqueous solution of sodium peroxodisulfate |

The initial charge was heated without the 50% aqueous solution of 2-acrylamido-2-methylpropanesulfonic acid to 95° C. (external temperature; polymerization temperature 90° C., stirring speed 150 rpm). The 50% aqueous solution of 2-acrylamido-2-methylpropanesulfonic acid was added and the mixture was stirred for 15 minutes. Then feed 1 and feed 2 were commenced. Feed 1 was metered in over 3 hours, feed 2 over 3.5 hours. The stirring speed was reduced back to 100 rpm, and stirring continued for 30 minutes. Over the course of 30 minutes, 11.7 g of a 10% aqueous solution of tert-butyl hydroperoxide and 9.1 g of a 10% aqueous solution of hydroxymethanesulfinic acid were metered in. 2.61 g of a 5% aqueous hydrogen peroxide solution were added, and the mixture was stirred for 10 minutes. After cooling, neutralization was carried out with 1.57 g of 25% aqueous $NH_3$, and 161.77 g of water were added. This gave 2620 g of a 51.6% aqueous dispersion.

2) Comparative Dispersion (Two-Stage) (Without Inventive Monomers I)

The components below were introduced into a polymerization vessel equipped with metering means and temperature regulation:

Initial Charge:

| | |
|---|---|
| 389.7 g | water |
| 51.07 g | polystyrene seed latex (33% in water) |

In a first feed vessel, an emulsion was prepared from the following components:
Feed 1

| | |
|---|---|
| 323.9 g | water |
| 9.7 g | 20% aqueous solution of $C_{16-18}$ fatty alcohol polyethoxylate |
| 23.15 g | 28% aqueous solution of sodium lauryl polyethoxysulfate |
| 9.07 g | 50% aqueous solution of acrylic acid |
| 462.3 g | n-butyl acrylate |
| 178.8 g | methyl methacrylate |

In a second feed vessel, an emulsion was prepared from the following components:
Feed 2

| | |
|---|---|
| 320.7 g | water |
| 9.7 g | 20% aqueous solution of $C_{16-18}$ fatty alcohol polyethoxylate |
| 23.15 g | 28% aqueous solution of sodium lauryl polyethoxysulfate |
| 10.37 g | 50% aqueous solution of acrylamide |
| 9.07 g | 50% aqueous solution of acrylic acid |
| 210.0 g | n-butyl acrylate |
| 431.0 g | methyl methacrylate |

In a third feed vessel the following feed was prepared:
Feed 3

| | |
|---|---|
| 55.6 g | 7% aqueous solution of sodium peroxodisulfate |

The initial charge was heated (external temperature: 90° C. polymerization temperature: 83° C., stirring speed: 150 rpm). Feeds 1 and 3 were commenced simultaneously. Feed 1 was metered in over 1.5 hours, and then feed 2 over 1.5 hours. Feed 3 was metered in over 3 hours. This was followed by stirring for 30 minutes, after which, over the course of 1 hour, 11.7 g of a 10% aqueous solution of tert-butyl hydroperoxide and 9.1 g of a 10% aqueous solution of hydroxymethanesulfinic acid were metered in. This was followed by neutralization with 55.09 g of 2% aqueous NaOH, stirring for 10 minutes, reduction in the stirring speed to 100 rpm, and cooling. Thereafter 2.6 g of a 5% aqueous hydrogen peroxide solution and 78.78 g of water were added. This gave 2674 g of a 49.9% dispersion.

3) Exemplary Dispersion (Two-Stage), Inventive, with Monomers I

The components below were introduced into a polymerization vessel equipped with metering means and temperature regulation:
Initial Charge:

| | |
|---|---|
| 389.7 g | water |
| 51.07 g | polystyrene seed latex (33% in water) |

In a first feed vessel, an emulsion was prepared from the following components:
Feed 1

| | |
|---|---|
| 323.9 g | water |
| 9.7 g | 20% aqueous solution of $C_{16-18}$ fatty alcohol polyethoxylate |
| 23.15 g | 28% aqueous solution of sodium lauryl polyethoxysulfate |
| 9.07 g | 50% aqueous solution of 2-acrylamido-2-methylpropanesulfonic acid |
| 462.3 g | n-butyl acrylate |
| 178.8 g | methyl methacrylate |

In a second feed vessel, an emulsion was prepared from the following components:
Feed 2

| | |
|---|---|
| 320.7 g | water |
| 9.7 g | 20% aqueous solution of $C_{16-18}$ fatty alcohol polyethoxylate |
| 23.15 g | 28% aqueous solution of sodium lauryl polyethoxysulfate |
| 10.37 g | 50% aqueous solution of acrylamide |
| 9.07 g | 50% aqueous solution of 2-acrylamido-2-methylpropanesulfonic acid |
| 210.0 g | n-butyl acrylate |
| 431.0 g | methyl methacrylate |

In a third feed vessel the following feed was prepared:
Feed 3

| | |
|---|---|
| 55.6 g | 7% aqueous solution of sodium peroxodisulfate |

The initial charge was heated (external temperature: 90° C. polymerization temperature: 83° C., stirring speed: 150 rpm). Feeds 1 and 3 were commenced simultaneously. Feed 1 was metered in over 1.5 hours, and then feed 2 over 1.5 hours. Feed 3 was metered in over 3 hours. This was followed by stirring for 30 minutes, after which, over the course of 1 hour, 11.7 g of a 10% aqueous solution of tert-butyl hydroperoxide and 9.1 g of a 10% aqueous solution of hydroxymethanesulfinic acid were metered in. This was followed by neutralization with 55.09 g of 2% aqueous NaOH, stirring for 10 minutes, reduction in the stirring speed to 100 rpm, and cooling. Thereafter 2.6 g of a 5% aqueous hydrogen peroxide solution and 78.78 g of water were added. This gave 2674 g of a 49.9% dispersion.

4) Exemplary Dispersion (Two-Stage), Inventive, with Monomers I, More Hard Phase The components below were introduced into a polymerization vessel equipped with metering means and temperature regulation:
Initial Charge:

| | |
|---|---|
| 389.7 g | water |
| 51.07 g | polystyrene seed latex (33% in water) |

In a first feed vessel, an emulsion was prepared from the following components:

Feed 1

| | |
|---|---|
| 129.6 g | water |
| 3.89 g | 20% aqueous solution of $C_{16-18}$ fatty alcohol polyethoxylate |
| 9.26 g | 28% aqueous solution of sodium lauryl polyethoxysulfate |
| 3.63 g | 50% aqueous solution of 2-acrylamido-2-methylpropanesulfonic acid |
| 184.9 g | n-butyl acrylate |
| 71.50 g | methyl methacrylate |

In a second feed vessel, an emulsion was prepared from the following components:

Feed 2

| | |
|---|---|
| 515.0 g | water |
| 15.56 g | 20% aqueous solution of $C_{16-18}$ fatty alcohol polyethoxylate |
| 37.04 g | 28% aqueous solution of sodium lauryl polyethoxysulfate |
| 10.37 g | 50% aqueous solution of acrylamide |
| 14.52 g | 50% aqueous solution of 2-acrylamido-2-methylpropanesulfonic acid |
| 336.0 g | n-butyl acrylate |
| 689.6 g | methyl methacrylate |

In a third feed vessel the following feed was prepared:
Feed 3

| | |
|---|---|
| 55.6 g | 7% aqueous solution of sodium peroxodisulfate |

The initial charge was heated (external temperature: 90° C. polymerization temperature: 83° C., stirring speed: 150 rpm). Feeds 1 and 3 were commenced simultaneously. Feed 1 was metered in over 36 minutes, and then feed 2 over 2 hours 24 minutes. Feed 3 was metered in over 3 hours. This was followed by stirring for 30 minutes, after which, over the course of 1 hour, 11.7 g of a 10% aqueous solution of tert-butyl hydroperoxide and 9.1 g of a 10% aqueous solution of hydroxymethanesulfinic acid were metered in. This was followed by neutralization with 55.09 g of 2% aqueous NaOH, stirring for 10 minutes, reduction in the stirring speed to 100 rpm, and cooling. Thereafter 2.6 g of a 5% aqueous hydrogen peroxide solution and 78.78 g of water were added. This gave 2674 g of a 49.7% dispersion.

5) Exemplary Dispersion (Two-Stage), Inventive, with Monomers I, with Chain Transfer Regulator and Crosslinker The components below were introduced into a polymerization vessel equipped with metering means and temperature regulation:

Initial Charge:

| | | |
|---|---|---|
| 389.7 g | water | |
| 51.07 g | polystyrene seed latex (33% in water) | |

In a first feed vessel, an emulsion was prepared from the following components:

Feed 1

| | |
|---|---|
| 327.2 g | water |
| 9.7 g | 20% aqueous solution of $C_{16-18}$ fatty alcohol polyethoxylate |
| 23.15 g | 28% aqueous solution of sodium lauryl polyethoxysulfate |
| 5.19 g | 50% aqueous solution of acrylamide |
| 9.07 g | 50% aqueous solution of 2-acrylamido-2-methylpropanesulfonic acid |
| 3.24 g | 3-methacryloyloxypropyltrimethoxysilane |
| 465.4 g | n-butyl acrylate |
| 175.7 g | methyl methacrylate |

In a second feed vessel, an emulsion was prepared from the following components:

Feed 2

| | |
|---|---|
| 331.7 g | water |
| 9.7 g | 20% aqueous solution of $C_{16-18}$ fatty alcohol polyethoxylate |
| 23.15 g | 28% aqueous solution of sodium lauryl polyethoxysulfate |
| 5.19 g | 50% aqueous solution of acrylamide |
| 9.07 g | 50% aqueous solution of 2-acrylamido-2-methylpropanesulfonic acid |
| 7.78 g | tert-dodecylmercaptan |
| 1.30 g | allyl methacrylate |
| 3.24 g | 3-methacryloyloxypropyltrimethoxysilane |
| 207.5 g | n-butyl acrylate |
| 432.2 g | methyl methacrylate |

In a third feed vessel the following feed was prepared:
Feed 3

| | |
|---|---|
| 55.6 g | 7% aqueous solution of sodium peroxodisulfate |

The initial charge was heated (external temperature: 90° C. polymerization temperature: 83° C., stirring speed: 150 rpm). Feeds 1 and 3 were commenced simultaneously. Feed 1 was metered in over 1.5 hours, and then feed 2 over 1.5 hours. Feed 3 was metered in over 3 hours. This was followed by stirring for 30 minutes, after which, over the course of 1 hour, 11.7 g of a 10% aqueous solution of tert-butyl hydroperoxide and 9.1 g of a 10% aqueous solution of hydroxymethanesulfinic acid were metered in. This was followed by neutralization with 55.09 g of 2% aqueous NaOH, stirring for 10 minutes, reduction in the stirring speed to 100 rpm, and cooling. Thereafter 2.6 g of a 5% aqueous hydrogen peroxide solution and 69.18 g of water were added. This gave 2703 g of a 49.9% dispersion.

Performance Testing:
Performance Testing: Wet Coating
(Rating after 5 days+60° C. steam bath)
For determining the performance properties of the dispersions of the invention, paints were produced to the following formula:

| | |
|---|---|
| 92 g | water |
| 0.5 g | Tylose 30000YP2 (ShinEtsu Tylose GmbH & Co. KG, Wiesbaden) |
| 0.5 g | 25% ammonia |
| 15 g | Ultradispers MD20 (dispersant, BASF SE, Ludwigshafen) |
| 3 g | Byk 024 (Defoamer, Byk Chemie, Wesel) |
| 30.2 g | titanium dioxide (Kronos 2310) (Kronos International Inc., Leverkusen) |
| 173.2 g | black iron oxide |

-continued

| | |
|---|---|
| 26.5 g | calcium carbonate (Omyacarb 850 OG, Omya GmbH, Cologne) |
| 595.8 g | binder dispersion |
| 8.5 g | water |
| 15 g | Dowanol DPnB (Dow Chemical Germany, Schwalbach) |
| 24 g | wax dispersion (Michem Lube 368.E, Michelman Inc., Capellen, Luxembourg) |
| 8 g | Acticide MKB3 (Thor GmbH, Speyer) |

The paints were sprayed onto preheated (80° C.), cured fiber cement sheets, with an applied weight of approximately 10 g.

The coated fiber cement sheet was subsequently dried at 80° C. for 30 minutes. After drying, the coated fiber cement sheet was placed for 5 days face up in a waterbath at 60° C.

Immediately upon removal of the fiber cement sheet from the waterbath, in the wet state, the whitening behavior was assessed.

1 no whitening
2 a few white spots
3 a few white flecks
4 a number of larger white areas
5 white area After the coated sheet had been dried off, the degree of efflorescence was assessed visually. This assessment was based on the following scale of ratings:

0=no efflorescence
1=virtually no efflorescence
2=slight efflorescence
3=moderate efflorescence
4=severe efflorescence
5=very severe efflorescence In order to determine the color change of coated fiber cement sheets exposed to weathering, an assessment is made of the difference in lightness between the weathered and unweathered area, visually. This is done on the basis of a scale from 0 to 2:

0=no difference
1=slightly perceptible difference
2=distinctly perceptible difference The "visual impression" test describes the quality of the coating in its entirety without exposure beforehand. The important factor is a uniform, slightly lustrous appearance of the coated roof shingle, without defects.

Blocking Test

The paints were applied to preheated (80° C.), cured fiber cement sheets, with an application weight of approximately 10 g. The coated fiber cement sheet was subsequently dried at 80° C. for 30 minutes. After drying had taken place, two coated fiber cement sheets were placed with their faces against one another, and a 180 kilogram weight was applied to the area of 10*10 cm at 50° C. for 24 hours. The sheets were then cooled to room temperature and an attempt was made to part the sheets.

0=The specimens come apart without force
1=The specimens can be parted without application of force
2=The specimens can be parted with slight application of force
3=The specimens can be parted with greater application of force
4=The specimens can be parted with strong application of force
5=The specimens can no longer be parted

TABLE 1

Performance testing on fiber cement sheets

| Example | Color difference, dry between e and u | Whitening | Efflorescence | Visual appearance | Blocking test |
|---|---|---|---|---|---|
| Comp. 1 | 2 | 3 | 2 | moderate, flecky | 2.5 |
| Comp. 2 | 1-2 | 2 | 1-2 | good - moderate | 2 |
| 3 | 0 | 1-2 | 0 | good | 1.5 |
| 4 | 0 | 1 | 0 | good | 1 |
| 5 | 0 | 1 | 0 | good | 1 | e exposed
u unexposed

Weathering Testing

To test the weathering stability of the paints on fiber cement sheets, a Xenon test is carried out in accordance with DIN EN ISO 11341 (cycle A), and inspection takes place after 500 hours in each case. In this Xenon test, coated fiber cement sheets with a size of 5*13 cm are each illuminated in alternation for 102 minutes dry and for 18 minutes during which the sheets are dampened with a fine water mist. The relative humidity is set at 50% and the black standard temperature is 65° C. The irradiation power corresponds to 60 W UV light at 300-400 nm or 0.51 W/(m²·nm) at a 340 nm light wavelength.

Damage criteria assessed are visible paint damage, such as cracks or delamination, color changes, and loss of gloss. The paint's gloss is measured with a gloss meter at a 60° angle before and after the weathering test.

Results of Xenon Test after 1500-hour Test Duration in Each Case:

Comp. Ex. 1: severe loss of gloss, first small cracks visible, loss of gloss 70%
Comp. Ex. 2: visible loss of gloss, loss of gloss 50%
Ex. 3: slight loss of gloss, loss of gloss 20%
Ex. 4: no perceptible loss of gloss, loss of gloss 0%
Ex. 5: slight loss of gloss, loss of gloss 15%

The invention claimed is:

1. An aqueous multistage polymer dispersion, comprising:
a soft phase having a glass transition temperature ranging from −30° C. to 0° C.; and
a hard phase having a glass transition temperature ranging from 20° C. to 60° C.,
said soft phase and said hard phase each comprising at least one monomer of formula (I):

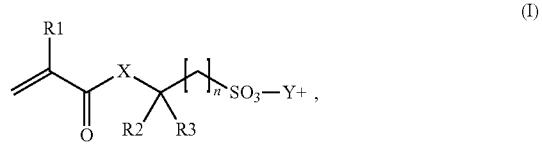

wherein:
n represents an integer of 0 to 2;
R1, R2, R3 independently represent hydrogen or methyl group;
X represents O or NH
Y represents H, an alkali metal, or $NH_4$;
a hard-to-soft stage ratio of the aqueous multistage polymer dispersion ranges from 25:75 to 95:5 based on relative weights; and the soft phase is a soft-phase copolymer comprising, to an extent of at least 80% and up to 99% by weight, at least one principal monomer selected from the group consisting of a $C_1$ to $C_{10}$ alkyl (meth)acrylate, an amide of an α,β-unsaturated $C_3$-$C_6$ carboxylic acid, and a hydroxyalkyl ester of an α,β-unsaturated $C_3$-$C_6$ carboxylic acid.

2. The aqueous polymer dispersion according to claim 1, wherein the monomer of formula (I) is at least one selected from the group consisting of 2-acrylamido-2-methylpropanesulfonic acid (AMPS), methacrylic acid 3'-sulfopropyl ester, acrylic acid 3'-sulfopropyl ester, and methacrylic acid 2'-sulfoethyl ester.

3. The aqueous polymerization dispersion according to claim 1 or 2, wherein the soft phase, has a glass transition temperature ranging from −20 to 0° C., and the hard phase has a glass transition temperature ranging from 30 to 50° C.

4. The aqueous polymer dispersion according to any one of claim 1 or 2, wherein a polymer of the soft phase is a soft-phase copolymer satisfying the following conditions:
    (i) an amount of the soft-phase copolymer ranges from 5% to 50% by weight, based on 100 parts by weight of the total monomers polymerized in the soft phase and the hard phase;
    (ii) the soft-phase copolymer comprises, to an extent of at least 80% and up to 99% by weight, at least one principal monomer selected from the group consisting of acrylamide, methacrylamide, 2-hydroxyethyl acrylate, 2-hydroxyethyl methacrylate, 2-hydroxypropyl (meth)acrylate or 1,4-butanediol monoacrylate, and mixtures of these monomers
    (iii) the soft-phase copolymer comprises, to an extent of at least 0.1% and up to 5% by weight, of the at least one monomer of formula (I).

5. The aqueous polymer dispersion according to any one of claims 1 or 2, wherein the soft phase and the hard phase further comprise a silane monomer.

6. The aqueous polymer dispersion according to claim 5, wherein the silane monomer is a vinyltrialkoxysilane or a (meth)acryloyloxyalkyltrialkoxysilane.

7. The aqueous polymer dispersion according to claim 6, wherein an amount of the silane monomer is up to 2% by weight, based on a total weight of monomers in the soft phase and the hard phase.

8. A process for preparing the aqueous multistage polymer dispersion according to claim 1, the process comprising independently polymerizing the soft phase and the hard phase by free-radically initiated aqueous emulsion polymerization.

9. A coating composition, comprising the aqueous multistage polymer dispersion according to any one of claims 1 or 2.

10. A binder, comprising the aqueous multistage polymer dispersion according to any one of claims 1 or 2.

11. An additive suitable for mineral or non-mineral substances, the additive comprising the aqueous multistage polymer dispersion according to any one of claims 1 or 2.

12. A mineral molding, comprising a coating comprising the aqueous multistage polymer dispersion according to any one of claims 1 or 2.

13. A fiber cement sheet, comprising a coating comprising the aqueous multistage polymer dispersion according to any one of claims 1 or 2.

14. The aqueous polymer dispersion according to claim 1, wherein a polymer of the soft phase is a soft-phase copolymer satisfying the following conditions:
    (i) an amount of the soft-phase copolymer ranges from 5% to 50% by weight, based on 100 parts by weight of the total monomers polymerized in the soft phase and the hard phase;
    (ii) the soft-phase copolymer comprises, to an extent of at least 80% and up to 99% by weight, at least one principal monomer selected from the group consisting of acrylamide, methacrylamide, 2-hydroxyethyl acrylate, 2-hydroxyethyl methacrylate, 2-hydroxypropyl (meth)acrylate, and 1,4-butanediol monoacrylate, n-butyl acrylate, and methyl methacrylate;
    (iii) the soft-phase copolymer comprises, to an extent of at least 0.1% and up to 5% by weight, of the at least one selected from the group consisting of 2-acrylamido-2-methylpropanesulfonic acid (AMPS), methacrylic acid 3'-sulfopropyl ester, acrylic acid 3'-sulfopropyl ester, and methacrylic acid 2'-sulfoethyl ester.

15. The aqueous polymer dispersion according to claim 1, wherein a polymer of the soft phase is a soft-phase copolymer satisfying the following conditions:
    (i) an amount of the soft-phase copolymer ranges from 5% to 50% by weight, based on 100 parts by weight of the total monomers polymerized in the soft phase and the hard phase;
    (ii) the soft-phase copolymer comprises, to an extent of at least 80% and up to 99% by weight, at least one principal monomer selected from the group consisting of n-butyl acrylate, methyl methacrylate, and acrylamide;
    (iii) the soft-phase copolymer comprises, to an extent of at least 0.1% and up to 5% by weight, of the at least one selected from the group consisting of 2-acrylamido-2-methylpropanesulfonic acid (AMPS), methacrylic acid 3'-sulfopropyl ester, acrylic acid 3'-sulfopropyl ester, and methacrylic acid 2'-sulfoethyl ester.

16. The aqueous polymer dispersion according to claim 5, wherein the silane monomer is a vinyltrialkoxysilane selected from the group consisting of vinyltrimethoxysilane, alkylvinyldialkoxysilanes, and methylvinyldialkoxysilane, or a (meth)acryloyloxyalkyltrialkoxysilane selected from the group consisting of (meth)acryloyloxypropyltrimethoxysilane and (meth)acryloyloxypropyltriethoxysilane.

* * * * *